United States Patent
Sakamoto et al.

(10) Patent No.: US 9,518,603 B2
(45) Date of Patent: Dec. 13, 2016

(54) BEARING APPARATUS

(75) Inventors: Shinichiro Sakamoto, Toyota (JP); Atsushi Koyama, Toyota (JP)

(73) Assignee: TAIHO KOGYO CO., LTD., Aichi (JP)

(*) Notice: Subject to any disclaimer, the term of this patent is extended or adjusted under 35 U.S.C. 154(b) by 510 days.

(21) Appl. No.: 13/642,703

(22) PCT Filed: Apr. 22, 2011

(86) PCT No.: PCT/JP2011/059988
§ 371 (c)(1),
(2), (4) Date: Dec. 10, 2012

(87) PCT Pub. No.: WO2011/132788
PCT Pub. Date: Oct. 27, 2011

(65) Prior Publication Data
US 2013/0108197 A1    May 2, 2013

(30) Foreign Application Priority Data

Apr. 22, 2010 (JP) .................................. 2010-099308

(51) Int. Cl.
*C22C 21/00* (2006.01)
*F16C 17/12* (2006.01)
(Continued)

(52) U.S. Cl.
CPC .............. *F16C 17/12* (2013.01); *C22C 21/003* (2013.01); *F16C 17/02* (2013.01); *F16C 33/121* (2013.01);
(Continued)

(58) Field of Classification Search
CPC ...... C22C 21/003; F16C 17/02; F16C 17/022; F16C 17/12; F16C 33/06; F16C 33/121; F16C 2204/22; F16C 2202/04

See application file for complete search history.

(56) References Cited

U.S. PATENT DOCUMENTS 4,296,183 A * 10/1981 Iwahana et al. .............. 428/653
4,452,866 A * 6/1984 Kamiya et al. .............. 428/653
(Continued)

FOREIGN PATENT DOCUMENTS

| EP | 2 105 518 A2 | 9/2009 |
|---|---|---|
| GB | 2 367 070 A | 3/2002 |

(Continued)

OTHER PUBLICATIONS

Yuan G. C. et al., "Study on Crystallization and microstructure for new series of Al—Sn—Si alloys", Materials Science and Engineering, A280, (2000), pp. 108-115, Cited in Extended European Search Report dated Jan. 29, 2014, issued in European Patent Application No. 11772119.1.

(Continued)

*Primary Examiner* — Alan B Waits
(74) *Attorney, Agent, or Firm* — Westerman, Hattori, Daniels & Adrian, LLP (57) ABSTRACT

In a bearing apparatus provided herein a hard steel shaft is an opposite shaft of an Al—Sn—Si based alloy plain bearing. Its wear resistance is enhanced. The bearing apparatus comprises a steel shaft having hardness of Hv 500 or more at least on a surface thereof, and a plain bearing. The plain bearing is formed of an aluminum alloy containing 2 to 10 mass % of Si, 8 to 18 mass % Sn, and the balance being Al and unavoidable impurities, wherein the volume of Sn phase is 50% or more of the volume of the Si particles(the average particle diameter of Si of the aluminum alloy is 4 to 10 μm). The aluminum alloy has a hardness of Hv 45 or more.

8 Claims, 8 Drawing Sheets

(51) Int. Cl.
*F16C 33/12* (2006.01)
*F16C 17/02* (2006.01)

(52) U.S. Cl.
CPC ........ *F16C 2202/04* (2013.01); *F16C 2204/22* (2013.01)

(56) References Cited

U.S. PATENT DOCUMENTS

| | | | |
|---|---|---|---|
| 4,471,029 A | | 9/1984 | Fukuoka et al. |
| 4,696,867 A | | 9/1987 | Eastwood |
| 4,806,308 A | * | 2/1989 | Kamiya et al. ............... 420/530 |
| 5,162,100 A | * | 11/1992 | Tanaka et al. ................ 420/530 |
| 6,802,649 B2 | | 10/2004 | Kawagoe et al. ............ 384/276 |
| 6,845,686 B2 | * | 1/2005 | Tsuchiyama et al. .......... 74/569 |
| 6,875,290 B2 | | 4/2005 | Kagohara et al. ............ 148/437 |
| 6,886,984 B2 | * | 5/2005 | Sugita et al. ................ 384/294 |
| 7,041,387 B2 | * | 5/2006 | Kagohara et al. ............ 428/654 |
| 7,377,988 B2 | * | 5/2008 | Griffin et al. ................ 148/320 |
| 2003/0102059 A1 | | 6/2003 | Kagohara et al. |
| 2005/0249964 A1 | * | 11/2005 | Nakajima et al. ............ 428/553 |
| 2008/0050260 A1 | * | 2/2008 | Iwanami et al. ............. 418/55.6 |
| 2010/0144564 A1 | * | 6/2010 | Kamiya et al. ............... 508/108 |
| 2013/0108198 A1 | * | 5/2013 | Zushi et al. ................. 384/276 |
| 2013/0121628 A1 | * | 5/2013 | Inami et al. ................. 384/276 |
| 2014/0233875 A1 | * | 8/2014 | Kobayakawa et al. ....... 384/297 |
| 2014/0334973 A1 | * | 11/2014 | Kang ............................ 420/530 |

FOREIGN PATENT DOCUMENTS

| | | |
|---|---|---|
| JP | 59-193254 A | 11/1984 |
| JP | 60-036641 A | 2/1985 |
| JP | 02-057653 A | 2/1990 |
| JP | 02-102912 A | 4/1990 |
| JP | 06-235038 A | 8/1994 |
| JP | 08-013072 A | 1/1996 |
| JP | 2003-119530 A | 4/2003 |
| JP | 2004-028276 A | 1/2004 |
| JP | 2004-028278 A | 1/2004 |

OTHER PUBLICATIONS

Desaki T. et al., "Development of a new aluminum alloy bearing for small-sized diesel engines", JSAE Review, 21, (2000), pp. 143-147,Cited in Extended European Search Report dated Jan. 29, 2014, issued in European Patent Application No. 11772119.1.

Desaki T. et al., "Development of the aluminum alloy bearing with higher wear resistance", JSAE Review, 21, (2000), pp. 321-325, Cited in Extended European Search Report dated Jan. 29, 2014, issued in European Patent Application No. 11772119.1.

Extended European Search Report dated Jan. 29, 2014, issued in European Patent Application No. 11772119.1, (3 pages).

Desaki, Toru et al., "Development of the Aluminum Alloy Bearing with Higher Wear Resistance", Advance Papers of Academic Lecture Meeting of Corporate Juridical Person Automobile Engineering, pp. 17-20, No. 46-99; cited in specification.

Notification of Transmittal of Translation of the International Preliminary Report on Patentabililty (Form PCT/IB/338) of International Application No. PCT/JP2011/059988 mailed Nov. 6, 2012 with Forms PCT/IB/373 and PCT/ISA/237.

International Search Report of PCT/JP2011/059988, mailing date Jul. 19, 2011.

Autoren C. Wegst et al., "Stahlschlüssel," 2007, pp. 38-39 and 245.

Response filed on Apr. 27, 2016, to the Official Communication received from the European Patent Office dated Dec. 21, 2015 for counterpart European Patent Application 11772119.1 (11 pages).

* cited by examiner

BEARING APPARATUS

TECHNICAL FIELD

The present invention relates to a bearing apparatus comprising a rotary shaft and a plain bearing for supporting the rotary shaft. The rotary shaft is assembled in an automatic transmission (AT) or various auxiliary machines for an automobile. In a specific bearing apparatus, a rotary steel shaft hardened by heat treatment, surface hardening or the like is employed so as to adapt the bearing apparatus to sliding movement under severe conditions.

BACKGROUND TECHNIQUE

Patent Document 1: Japanese Unexamined Patent Publication (kokai) No. Hei 2-102912 discloses a bearing apparatus, in which a heat-treated S45C shaft (hardness HRc 55) and an aluminum-alloy plain bearing are combined.

Patent Document 2: Japanese Unexamined Patent Publication (kokai) No. Hei 2-57653 relates to a bearing apparatus, in which a heat-treated steel shaft (S45C, hardness HRc 55) and an aluminum-alloy plain bearing are combined. The aluminum alloy is Al—Sn based and contains, by weight percentage, 7 to 20% Sn, 0.1 to 5% Pb, 1 to 10% Si, 0.3 to 3.0% in total of one or more of Cu, Mg and Zn, and 0.01 to 1.0% in total of one or more of Cr, Mn, Fe, Ni, Co, Ti, V and Zr, with the balance essentially consisting of Al. In the Al—Sn based bearing alloy, 0.01 to 0.1% Sb is added to strengthen the matrix and to modify the shape of the dispersed and precipitated Si particles in the Al matrix to such forms as spheroid, oval, or those having rounded ends. In the case of end-rounded Si particles according to Patent Document 2, an ideal point contact is realized. The hardness of the alloy is about Hv 40.

Patent Document 3: Japanese Unexamined Patent Publication (kokai) No. Hei 6-235038 also relates to a bearing apparatus, in which a heat-treated steel shaft (S45C, HRc=55), and an aluminum-alloy plain bearing are combined. The aluminum alloy is Al—Sn based and contains, by weight percentage, 7 to 20% Sn, 0.1 to 5% Pb, 1 to 10% Si, and 0.01 to 1.0% in total of one or more of Cr, Mn, Fe, Ni, Co, Ti, V and Zr, and 0.3 to 3.0% in total of Zn and Mg, as well as 0.01 to 0.1% Sb, with the balance essentially consisting of Al. The dispersed and precipitated Si particles in the matrix are spheroid, oval, or have shapes with rounded ends. Sn—Pb alloy particles precipitate in the vicinity of such Si particles. The hardness of the alloy is slightly less than Hv 40.

Patent Document 4: Japanese Patent No. 3472284 relates to "an aluminum-based bearing alloy, characterized in that: it contains 1.5 to 8 mass % Si, with the balance essentially consisting of Al; the Si particles having a particle diameter of less than 4 µm account for 20 to 60% of the area of the Si particles present on the sliding surface and the Si particles having a particle diameter of 4 to 20 µm account for 40% or more of the area of the Si particles present on the sliding surface." The latter Si particles having a particle diameter of 4 to 20 µm (40% by area or more) contribute to wear resistance, and the former Si particles having a particle diameter of less than 4 µm (20 to 60% by area) contribute to fatigue resistance. During the wear resistance test, start and stop are repeated. Si particles having a particle diameter of 4 to 20 µm are subjected to the load of an opposite shaft but are neither buried in the Al matrix nor separated from the Al matrix. Wear resistance of the aluminum alloy against S55C, which is the opposite material in the Examples, is improved. Its heat treated state is not described.

Non-Patent Document 1: "Advance Papers of Academic Lecture Meeting of Corporate Juridical Person Automobile Engineering No. 46-99 , 211, Development of Aluminum-Alloy Bearing with Improved Wear Resistance" relates to a research of wear resistance of Al—Sn—Si alloy against an opposite shaft made of quenched steel (Hv 720-850). In the "Discussion" section of this document, the following is described. "The relatively soft matrix of Al alloy is exclusively worn out during the progress of wear. Therefore, Si enriches on the sliding surface. As the amount of Si increases on the sliding surface, much more load can be supported to such an extent that wear of bearing is suppressed. However, when Si particles have a small diameter or hardness is low, Si separates from the surface during sliding, as Si continuously enriches. Consequently, separation and enrichment of Si repeat during the progress of wear such that the Si concentration on the surface remains unchanged. On the other hand, when Si particles have a large diameter and hardness is high, Si is firmly held in the alloy and does not separate from the alloy. In this case, the progress of wear is slow."

The above notion has led to the development of a bearing alloy which has a composition of Al-4.5Sn-2.7Si-1.5Cu-0.2Cr-0.15Zr and the following features.

(1) Si is included in the aluminum-based bearing alloy as hard matter and has a size of 5.5 µm in terms of average particle diameter. Hardness of the developed material is 53HV. The developed material is wear resistant as high as three to four times the conventional material.

(2) Improved wear resistance is believed to be attributable to the mechanism that the enriched Si is firmly held on the sliding surface and hence bears load.

(3) Structure and strength of alloy having an average particle diameter of 5.5 µm is re-designed, and, as a result, fatigue resistance of the developed alloy under reciprocating load is equivalent to conventional materials, and fatigue resistance under a rotary load is improved as compared with conventional materials. Seizure resistance is improved as compared with a conventional material Al-12.5 Sn-2.7Si-1.8Pb-1Cu-0.2Cr alloy.

The applicants including the present applicant proposed in Patent Document 5: Japanese Unexamined Publication (kokai) No.2004-28278 a bearing apparatus comprising a shaft and a plain bearing. The shaft is a crank shaft made of a non-heat treated steel having a metallographic structure of pearlite or a metallographic structure consisting of 3% by area or less of primary ferrite and pearlite. The steel is neither high-frequency quenched nor surface hardened. The surface roughness of the crank shaft is Rz 0.5 µm or less. The hard matter formed of or comprising Si and having a hardness of Hv 900 or more is dispersed in the Al matrix. The hard matter having a size of 6 µm or less is present on the sliding surface. Cementite having approximately a hardness of Hv 700 and ferrite having a hardness of approximately Hv 150 to 300 are the structural elements of the non-heat treated steel.

The applicants including a present inventor propose in Patent Document No. 6: Japanese Unexamined Patent Publication (kokai) No. 2004-28276 a bearing apparatus comprising a shaft, which is the same as that of Patent Document No. 2. The hard matter in the Al matrix of the Al-based alloy is or comprises Si and has a hardness of Hv 900 or more. The Si content is 1 to 4 mass %.

An Al alloy proposed in Patent Documents Nos. 4 and 5 contains, by mass %, in addition to 2 to 20% of Sn, the following elements: 1 to 3% Pb, 0.5 to 2% Cu, 0.1 to 1% Cr, 0.5 to 2% Mg, and 0.1 to 1% of one or more selected from Zr, Mn, V, Ti and/or B. Si contained in said Al alloy takes the form of hard Si particles having a certain size and smoothens surface of a non-heat treated steel shaft. As a result, wear resistance and seizure resistance are improved.

From the overall review of the prior art references, the following technical level is specified in relation to the Si particles. In the case of a soft opposite shaft or material consisting of non-heat treated steel proposed in Patent Documents Nos. 5 and 6, the Si particles of aluminum alloy have lapping effect on the opposite shaft. In Patent Documents Nos. 1, 2 and 3, the Si particles of aluminum alloy are maintained to have a point contact with the quenched steel of the opposite shaft. Recently, since low viscous ATF has come to be used and various pumps are small-sized, the sliding conditions become severe. Therefore, required levels for wear and seizure resistances are enhanced. The start and stop conditions are employed in the wear test of Patent Document 4, because these conditions are severe and necessary to test enhanced level of wear and seizure. Patent Document 4, however, does not refer to the heat treated state of a steel shaft. Patent Document 4 describes that Si particles are held by the Al matrix during sliding. Non-patent Document 1, which was published around the same time as Patent Document 1, is believed to be the first publication stating that Al, Sn and the like are preferentially abraded by an opposite shaft made of quenched S55C, with the result that Si enriches on the sliding surface.

PRIOR ART DOCUMENTS

Patent Documents

Patent Document 1: Japanese Unexamined Patent Publication (kokai) No. Hei 2-102912
Patent Document 2: Japanese Unexamined Patent Publication (kokai) No. Hei 2-57653
Patent Document 3: Japanese Unexamined Patent Publication (kokai) No. Hei 6-235038
Patent Document 4: Japanese Patent Specification No. 34472284
Patent Document 5: Japanese Unexamined Patent Publication (kokai) No. 2004-28278
Patent Document 6: Japanese Unexamined Patent Publication (kokai) No. 2004-28276
Patent Document 7: U.S. Pat. No. 4,471,029

Non-patent Document

Non-patent Document 1: Advance Papers of Academic Lecture Meeting of Corporate Juridical Person Automobile Engineering No. 46-99, 211, Development of Aluminum-Alloy Bearing with Improved Wear Resistance"

DISCLOSURE OF INVENTION

Problems to be Solved by Invention

A method proposed in Non-patent Document 1 to improve wear resistance under severe conditions is to prevent Si particles from separating out of the matrix of aluminum alloy. However, it has turned out that the wear resistance is not satisfactorily improved, when the Sn content is as low as 4.5%. In Patent Documents Nos. 2 and 3, opposite material of the aluminum alloy is a heat-treated steel, but the aluminum alloy contains Pb and is soft. Therefore, it is an object of the present invention to improve wear resistance of an Al—Sn—Si plain bearing under severe sliding conditions, which bearing is used in a bearing apparatus together with a hard steel shaft.

Means for Solving Problems

A bearing apparatus according to the present invention is characterized by a combination of a steel shaft having hardness of Hv 500 or more at least on a surface thereof, and a plain bearing. An aluminum alloy used for the plain bearing contains 2 to 10 mass % Si, 8 to 18 mass % Sn, with the balance consisting of Al and unavoidable impurities, and has a hardness of Hv 45 or more. The volume of the Sn phase is 50% or more of the volume of Si particles having an average Si particle diameter of 4 to 10 μm. Here, when the volume of Sn phase is equal to the volume of Si particles, the former volume relative to the latter volume is 100%. That is, the volume of Sn phase/volume of Si particles=1×100%. This value exceeds 100%, when the volume % of Sn phase exceeds the volume of Si particles. The present invention is described hereinafter in more detail.

Effects of Invention

The Sn and Si contents, the average diameter of Si particles, the Sn/Si particle volume ratio %, the hardness were comprehensively adjusted in the Al—Sn—Si based alloy according to the present invention. As a result, its wear resistance against a hard steel shaft under severe sliding condition could be improved.

DESCRIPTION OF REFERENCE NUMERALS

Figure 8:
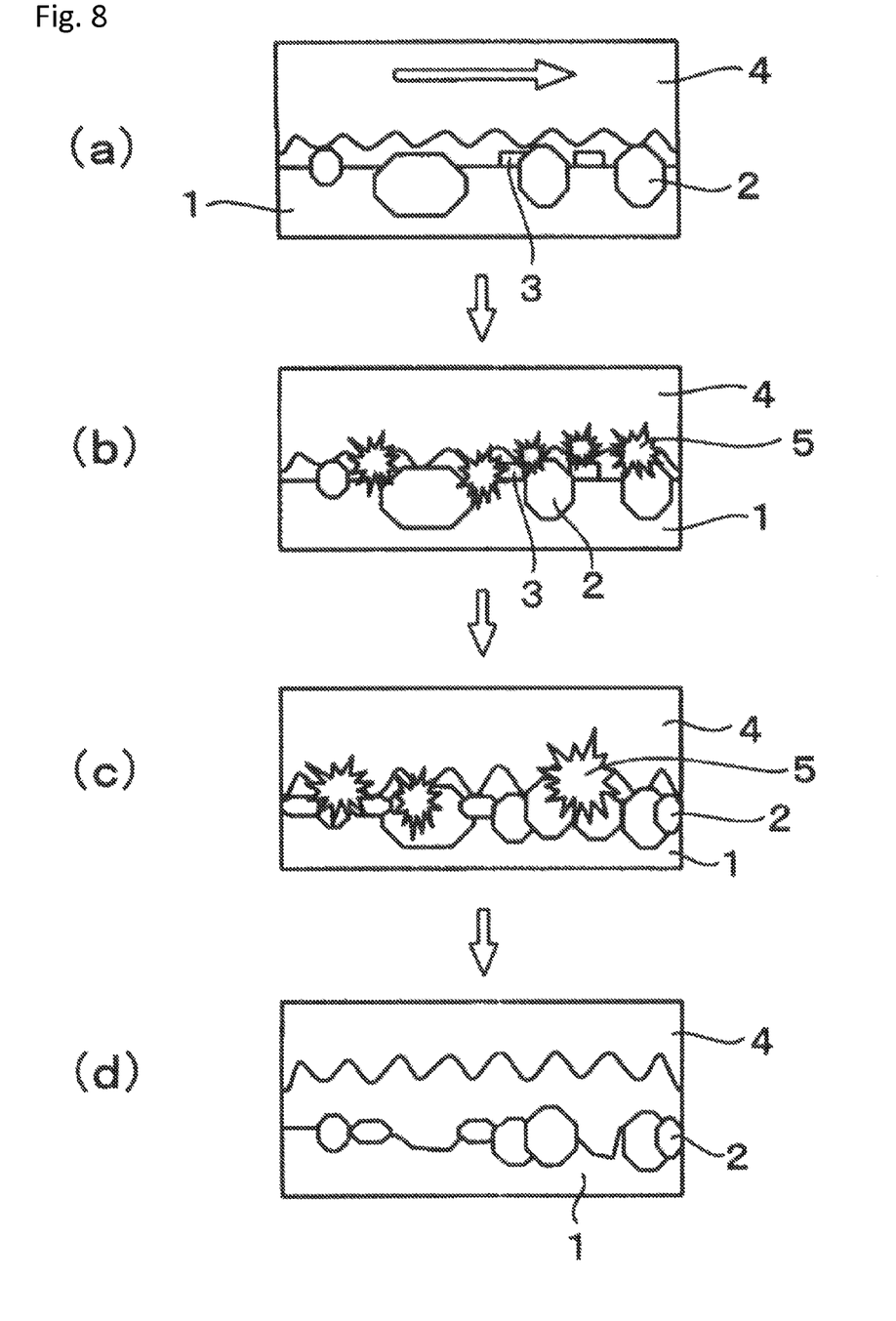
FIG. 8 A schematic drawing illustrating that Si enriches on the surface of an Al—Sn—Si based alloy having low Sn content.
Figure 9:
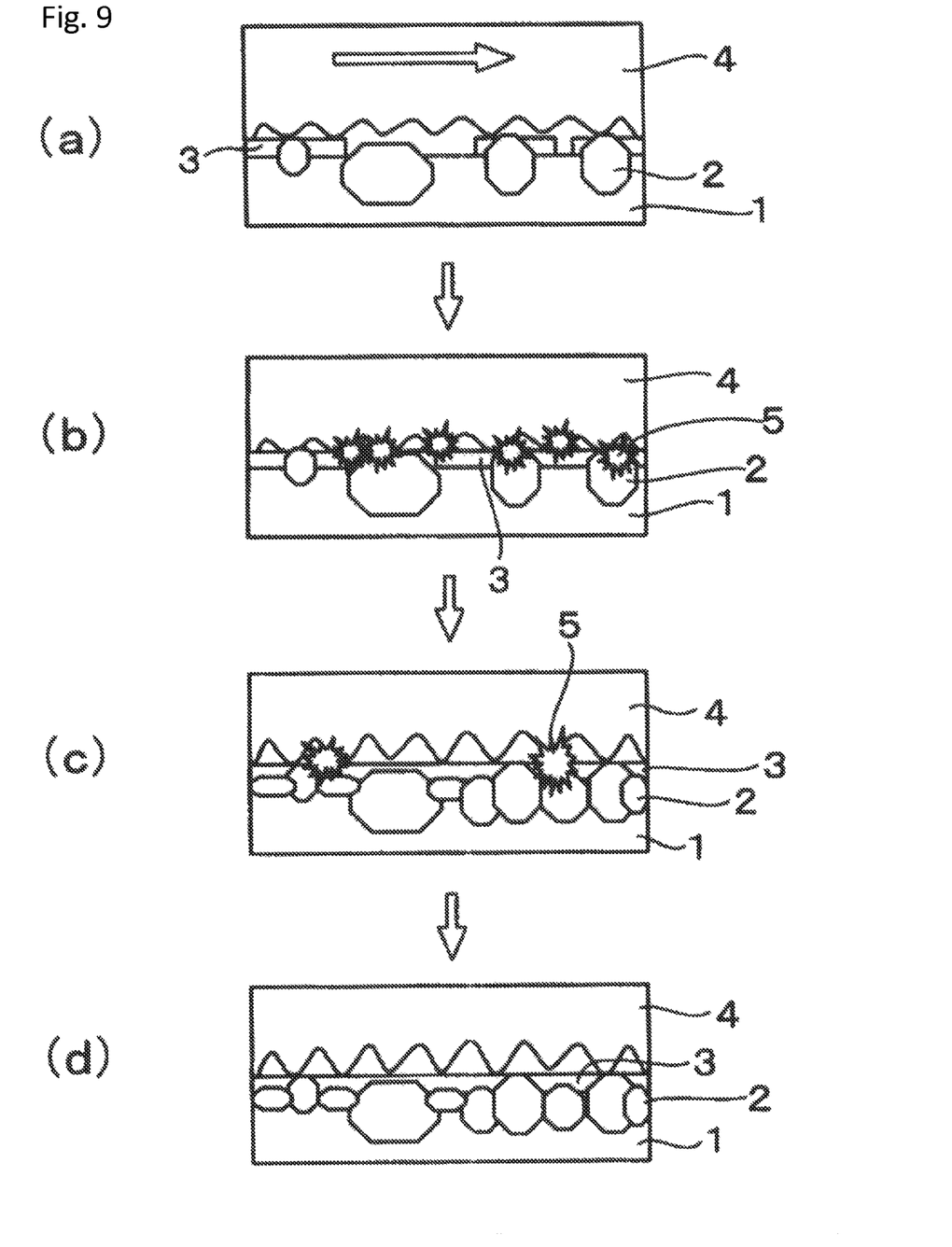
FIG. 9 A schematic drawing illustrating that Si enriches and is covered by Sn on the surface of an Al—Sn—Si alloy having high Sn content.
Figure 10:
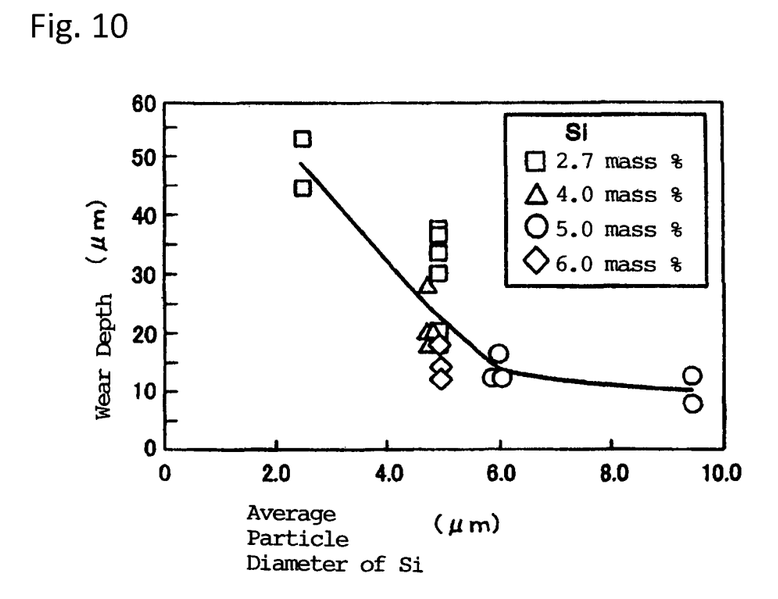
FIG. 10 A graph showing the results of wear test in the Examples.

1—Aluminum-alloy phase of a plain bearing
2—Si particles
3—Sn phase
4—Opposite shaft
5—The aluminum-alloy phase 1 of a plain bearing and the opposite shaft 4 contact at 5.

(1) Opposite Shaft

An opposite shaft used in the present invention is made of quenched carbon steel or alloyed steel, nitrided steel, carburized steel or the like and has hardness of Hv 500 or more at least on a surface thereof.

(2) Aluminum-Alloy Plain Bearing (a) Composition

A ternary Al—Sn—Si alloy is known per se in the technical field of aluminum alloy. The Al—Sn—Si aluminum alloy according to the present invention is free of such components as Pb and Sb which decrease high-temperature strength. The compositional range of the Al—Sn—Si based alloy according to the present invention is, by mass %, 2 to 10% Si and 8 to 18%, preferably, 3 to 10% Sn.

(b) Structure

In the present invention, the average diameter of Si particles falls in the range of 4 to 10 μm, and the volume of Si particles is 50% or more of the Si volume %. It was discovered that this structure is effective to prevent Si particles from separating and hence improves wear resistance of a bearing.

Figure 1:
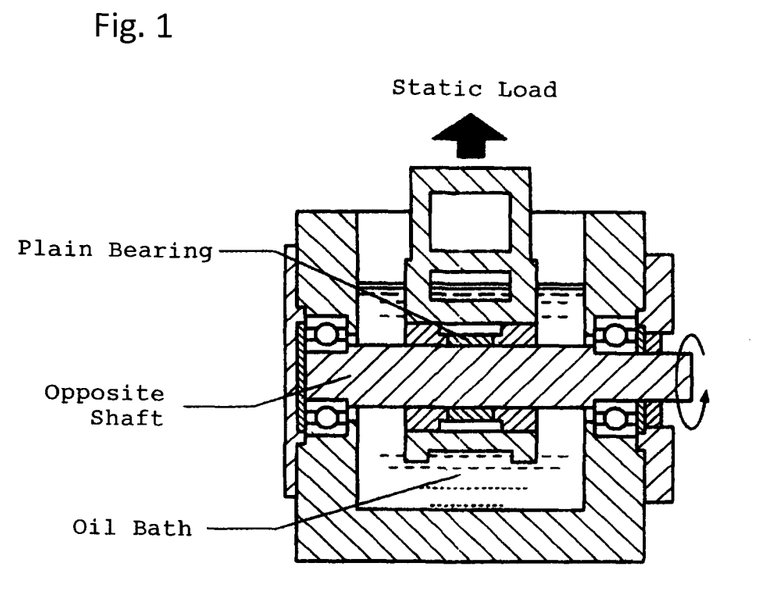
FIG. 1 A drawing of a wear tester
FIG. 2 A graph showing cycles of the start and stop test.
Figure 2:
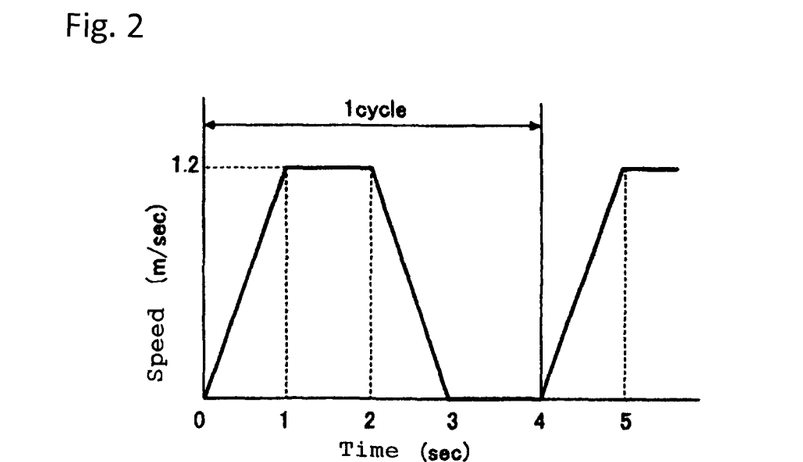

Wear resistance of a bearing was evaluated as follows. An inventive aluminum-alloy rolled sheet product is clad on a low-carbon steel sheet. The clad product is shaped into a cylindrical bushing having an outer diameter of 25 mm, and an inner diameter of 22 mm, and a bearing width of 10 mm. The bushing is tested in a static load friction tester shown in FIG. 1. FIG. 2 shows a test pattern. The test conditions are as follows.

Load: 490N
Test Pattern: start-stop test (0-1000 rpm)
Sliding Speed: 0-1.2 m/s
Lubricating Oil: ATF
Temperature of lubricating oil: 120 degrees C.
Material of shaft: SCM415 (Hardness Hv 800)

Figure 3:
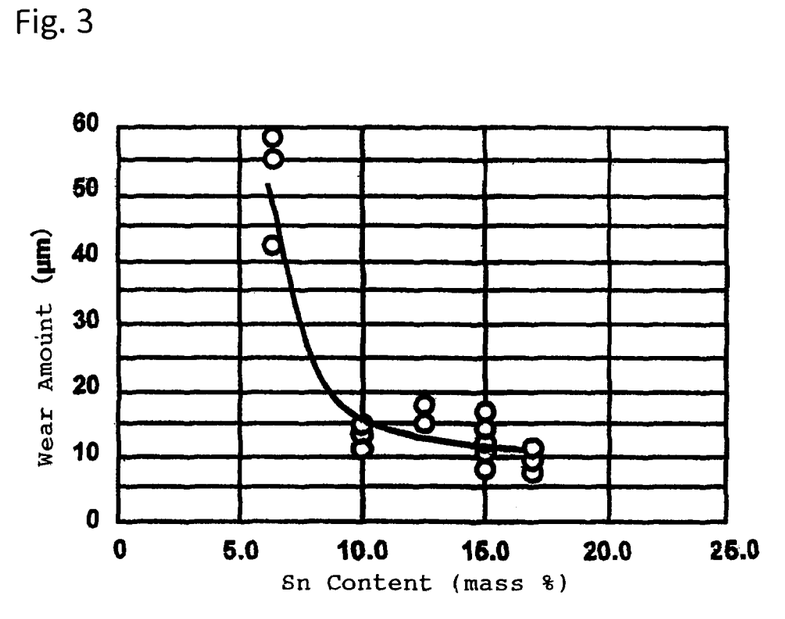
FIG. 3 A graph showing the Sn content of Al—Sn—Si based alloy and the results of wear test.

FIG. 3 shows the test results of the Al—Sn-5Si alloy. It is apparent from this drawing that, when Sn is in the range of 8 to 18%, the wear depth decreases to a very small level. Other than the above components, 3 mass % or less in total of at least one of Cu, Mg and Zn may be contained as a solute element(s) of the aluminum alloy. In addition, 0.5 mass % or less in total of at least one of Cr, Zr, Mn, V and Sc may be contained as a precipitating component(s). Inevitable impurities contained are Fe, Ti, B and the like in an amount of 0.5 mass % in total or less.

Figure 4:
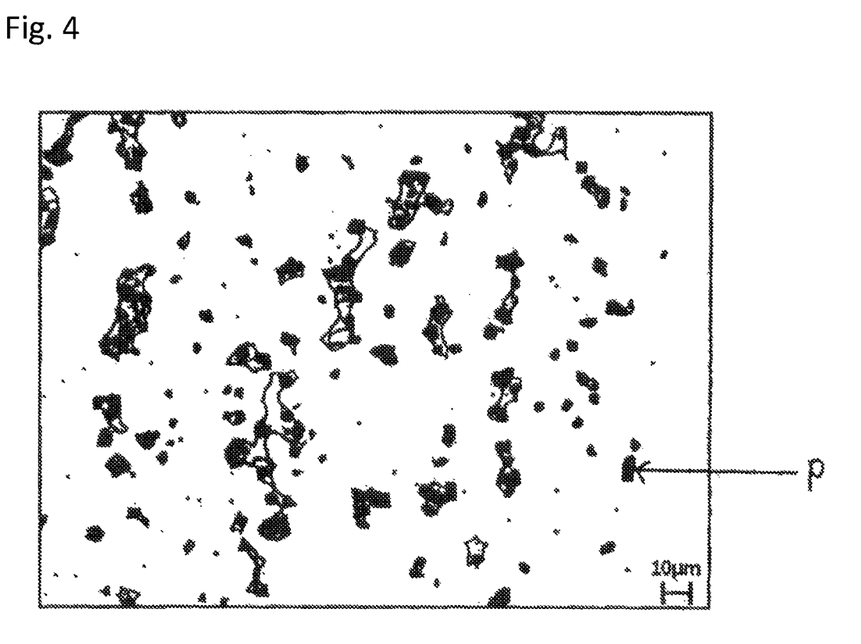
FIG. 4 A photograph showing the microscopic structure of an Al—Sn—Si based alloy.

In the production of the Al—Sn—Si based alloy according to the present invention, a first intermediate product is a continuously cast sheet, in which an Sn phase and eutectic Al-Si are present between the arms of Al dendritic crystals. The continuously cast sheet is then cold rolled. The Sn phase and the Si particles are broken into pieces, separately. The resultant cold-rolled sheet is pressure-bonded on a carbon steel sheet, that is, backing metal. The pressure bond material on the backing metal is annealed as described in Table 1 of Patent Document 7; U.S. Pat. No. 4,471,029. As the result of annealing, the size of the Si particles is adjusted, and the volume of Sn phase relative to the Si particles is adjusted. Annealing condition is adjusted within the temperature range of 350 to 550 degrees C. and the time range of 3 to 10 hours. The post annealing structure is shown in FIG. 4, in which the vertical direction is the rolling direction. The Sn phase, appearing in white, is elongated in the rolling direction. The Si particles, appearing in black, are dispersed and broken into pieces by rolling. The Sn phase and Si particles are detected in the Al matrix.

Figure 7:
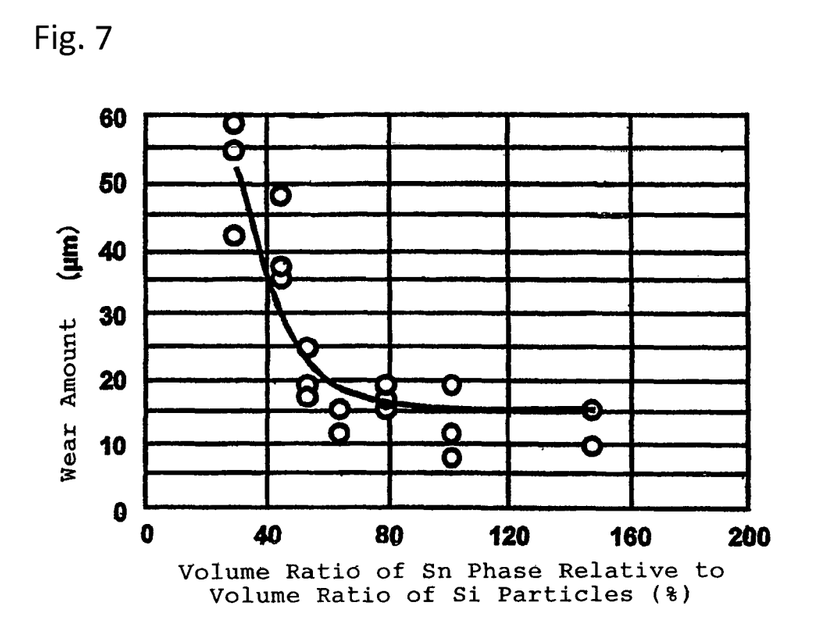
FIG. 7 A graph showing the relationship between the ratio of Sn/Si contents and the results of wear test.

FIG. 4 is an example of the optical microscope photograph taken in the cross section. The Si particles of FIG. 4 are analyzed by an image analyzer to calculate the diameter of a circle corresponding to the particles. The diameter of Si particles herein is the equivalent circle diameter. The volume % of Sn and Si in the alloy is calculated as follows. First, the weight of each component is calculated on a weight % basis. The calculated weight of each component in the alloy is converted to volume based on its density as a pure metal. The volume is again converted to volume % of the component. Sn is virtually not dissolved in the matrix of aluminum, while Si is dissolved in the matrix. The volume % of Si calculated as above is larger than the actual volume of Si particles, because the volume of the solute Si is included. The "Sn volume %/Si volume %" (×100) shown in FIG. 7 is based on the calculating method described above and well reflects the tendency of wear resistance. As is described above, the volume % of Sn and Si in the alloy was calculated on a weight % basis of Sn and Si in the alloy and densities of Sn and Si. Sn and Si may be present in any form other than the Sn phase and Si particles, for example, solute Si although in a trace amount. Since solute Si is not identified as Si particles, the "Sn volume/Si volume %" (×100) used in the present invention is based on an assumption that, even if Sn and Si are not identified as particles, they were present in the form of particles.

Figure 5:
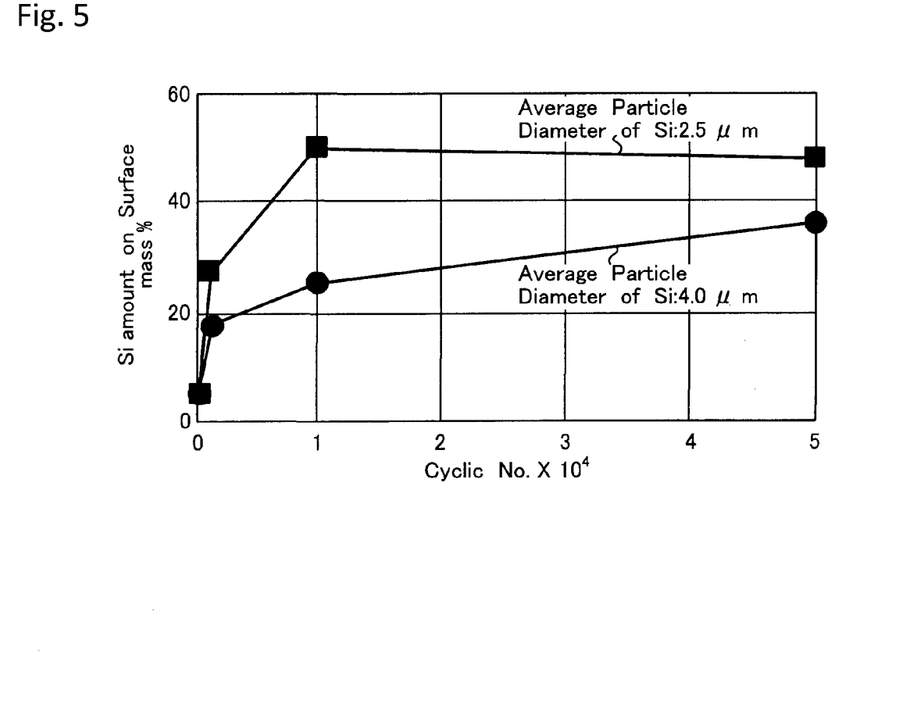
FIG. 5 A graph showing the relationship between the sequential cycles of the test illustrated in FIGS. 1 and 2, the particle diameter of Si and the amount of Si on the surface.
Figure 6:
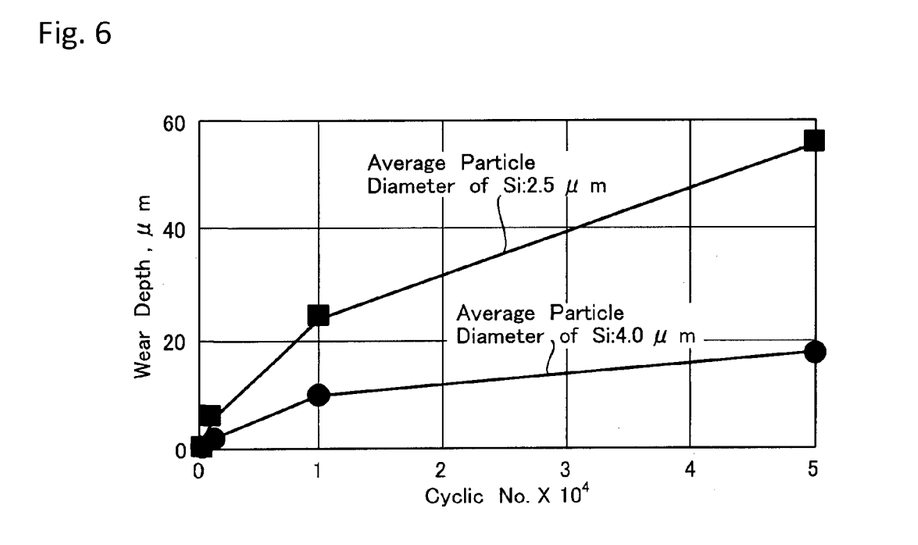
FIG. 6 A graph showing the relationship between the sequential cycles of the test illustrated in FIGS. 1 and 2, the particle diameter of Si, and wear depth.

An Si particle indicated by an arrow P in FIG. 4 has a circle-equivalent diameter of 4.5 μm. The maximum diameter of Si particles is less than 15 μm. The minimum diameter of Si particles, which can be identified under the resolution of a microscope, is approximately 0.1 μm. When the average particle diameter of Si particles is 2.5 μm, Si enriches on the sliding surface but wear advances. On the other hand, when the average diameter of Si particles is 4.0 μm or more, progress of wear is suppressed. The present inventors discovered that the enrichment of Si particles is influenced by the Si amount, average diameter of Si particles and Sn content, as shown in FIGS. 5 and 6. If the Si amount is small, wear proceeds until Si enriches on the sliding surface. Si particles having a small average diameter separate during operation. However, Si particles having a large average diameter are also liable to separate, if the Sn content is low. As is shown in FIG. 7, the wear resistance is improved, when the Sn content relative to the Si content is large, specifically, when the volume % of Sn in the alloy is 50% or more of the Si volume %. Mechanical properties are lowered when the Sn content exceeds 18 mass %.

(c) Hardness

The strength of an Al—Sn—Si based bearing alloy is not only influenced by the strengthening components. That is, as the Sn content, other than that of the strengthening components, is higher, the hardness lowers. The strength of the bearing alloy can also be adjusted by modifying the following factors: cladding with a steel sheet, annealing of the clad material, a subsequent cold rolling, and plastic working for shaping into a bearing. The Al—Sn—Si based alloy having the compositional range mentioned in Item (a) above, and the structure mentioned in Item (b) above, has improved properties, provided that the hardness is Hv 45 or more, preferably Hv 50 or more.

(d) Wear Resistance

The test carried out by the present inventors in Non-patent Document 1 is not under the constant number of revolution but under repeating start and stop conditions, where wear is liable to occur. The present inventors published that during the progress of wear, Sn is abraded and Si enriches on the surface of aluminum alloy, then, the Si particles separate from the surface of aluminum alloy.

FIGS. 8 and 9 schematically illustrate that the Si particles enrich and then separate from the sliding surface. Referring to these drawings, 1 denotes the aluminum-alloy phase of a plain bearing, 2 denotes the Si particles, 3 denotes the Sn phase, 4 denotes an opposite shaft having surface roughness. The plain bearing and the opposite shaft mutually contact at 5. The arrow indicates the sliding direction.

The aluminum-alloy phase 1 shown in FIG. 8 has a low Sn content. Therefore, Sn does not entirely cover the sliding surface, and the opposite shaft 4 is liable to be brought into contact with the aluminum phase 1 and the Si particles 2. Therefore, Si particles enrich, and the opposite shaft 4 is brought into direct contact with the enriched Si particles. In this case, serious friction occurs and the Si particles are liable to separate.

The aluminum-alloy shown in FIG. 9 has high Sn content. While the Si particles enrich, the Sn phase 3 spreads over the sliding surface and covers the concentrated Si particles 2. Therefore, contact friction of the aluminum-alloy with an opposite shaft 4 is slight. That is, in the case where the Si particles 2 are covered as described above (c), friction between the opposite shaft 4 and aluminum alloy becomes so small that the Si particles are prevented from separation. Meanwhile, enrichment of Si particles promotes, and therefore, wear of aluminum alloy is prevented.

(e) Clad Material

A plain bearing made of said aluminum-alloy is pressure bonded onto carbon steel, preferably a low-carbon steel, such as SPCC, SPHC or the like, by means of cold rolling. The plain bearing in the form of a clad material can be used.

BEST MODE FOR CARRYING OUT INVENTION

Example 1

Measurement of Enrichment of Si Particles and Sn Coverage

An Al—Sn—Si alloy containing 2 to 10 mass % Si and 8 to 18% Sn was continuously cast. The cast alloy was cold-rolled to a thickness of 1.7 mm and then pressure-bonded with a backing metal (SPCC), followed by annealing. The alloy components, the average diameter of Si particles (referred to as "Diameter of Si Particles" in the Table), and the hardness of the alloy are shown in Table 1.

TABLE 1

| Sn Content (%) | 7.0 | 7.0 | 15.0 | 15.0 |
| --- | --- | --- | --- | --- |
| Si Content (%) | 2.7 | 2.7 | 5.0 | 5.0 |
| Average Diameter of Si Particles(μm) | 2.5(*) | 5.0 | 6.5 | 9.5 |
| Hardness (Hv) | 53 | 53 | 61 | 63 |

Remarks:
*Comparative Example

Three kinds of Al—Sn—Si alloys shown in Table 2 were subjected to the start-stop wear test described above. The sliding surface before and after the test was analyzed. The five-point average values of Al, Sn and Si are shown in Table 2.

TABLE 2

| | Analytical Value of Surface before Test (mass %) | | | Analytical Value of Surface after Test (mass %) | | |
| --- | --- | --- | --- | --- | --- | --- |
| Classification | Al | Sn | Si | Al | Sn | Si |
| 1 | 86.2 | 6.0 | 6.0 | 67.8 | 4.1 | 26.6 |
| 2 | 80.3 | 12.5 | 5.0 | 47.8 | 9.5 | 40.2 |
| 3 | 83.2 | 12.5 | 2.7 | 35.6 | 8.1 | 55.5 |

In Table 2, the Si concentration on the sliding surface of Alloys Nos. 1 through 3 was measured before and after the wear test. The post-test Si concentration is higher than the pre-test Si concentration. It was ascertained that Si enriches more on the surface of Alloys Nos. 2 and 3 having 50% or more of the Sn phase relative to the volume % of Si particles. In order to verify the relationship between the Sn content and improvement in wear resistance, the post-tested bearing surface was subjected to observation under an electron microscope. A number of marks of the separated Si particles were observed on the surface of Alloy No. 1 having 6 mass % of Sn. On the other hand, almost no marks of the separated Si particles were present on the surface of Alloy Nos. 1 and 2 having 12.5 mass % of Sn. The sliding surfaces were subjected to EPMA. Distribution of the respective elements on the sliding surface was examined by mapping of the EPMA analyzed elements. It was ascertained that the Sn predominantly distributes along the periphery of Si particles.

Example 2

Examples of Aluminum Alloy Composition

The composition of Al—Sn—Si based alloys is shown in Table 3. Various main components and structures of these alloys are examined. The amount of wear was measured by the method described in Paragraph 0021.

TABLE 3

| | Sample No. | Alloy Components (mass %) | | | | | Alloy Components (volume %) | | | | | Volume Ratio Sn/Si | Diameter of Si Particles μm | Hardness of Alloy Hv | Wear Amount μm | Si Separation Yes/No |
| --- | --- | --- | --- | --- | --- | --- | --- | --- | --- | --- | --- | --- | --- | --- | --- | --- |
| | | Al | Sn | Si | Cu | Cr | Al | Sn | Si | Cu | Cr | | | | | |
| A | 1 | Bal | 9 | 2.5 | 1.5 | 0.20 | Bal | 3.6 | 3.1 | 0.48 | 0.08 | 114.5 | 10.0 | 53.0 | 16 | No |
| | 2 | Bal | 10 | 2.0 | 0.8 | 0.15 | Bal | 4.0 | 2.5 | 0.26 | 0.06 | 160.0 | 5.5 | 48.0 | 20 | No |
| | 3 | Bal | 12.5 | 2.7 | 1.0 | 0.15 | Bal | 5.0 | 3.4 | 0.33 | 0.06 | 147.1 | 4.5 | 50.0 | 20 | No |
| | 4 | Bal | 12.5 | 5.0 | 1.0 | 0.20 | Bal | 5.0 | 6.3 | 0.33 | 0.06 | 79.4 | 8.0 | 53.0 | 18 | No |
| | 5 | Bal | 15 | 5.0 | 1.5 | 0.17 | Bal | 6.1 | 6.4 | 0.50 | 0.07 | 95.3 | 5.5 | 55.0 | 15 | No |
| | 6 | Bal | 17 | 5.0 | 1.5 | 0.10 | Bal | 7.1 | 6.5 | 0.51 | 0.04 | 109.2 | 4.0 | 52.0 | 12 | No |
| | 7 | Bal | 18 | 4.0 | 1.5 | 0.10 | Bal | 7.5 | 5.3 | 0.51 | 0.04 | 141.5 | 6.0 | 50.0 | 17 | No |
| | 8 | Bal | 10 | 5.0 | 1.5 | 0.17 | Bal | 4.0 | 6.2 | 0.49 | 0.07 | 64.5 | 5.5 | 65.0 | 12 | No |
| | 9 | Bal | 12.5 | 7.0 | 1.8 | 0.20 | Bal | 5.0 | 8.8 | 0.59 | 0.08 | 56.8 | 4.0 | 60.0 | 14 | No |
| | 10 | Bal | 10 | 6.0 | 1.0 | | Bal | 3.9 | 7.4 | 0.32 | | 52.7 | 4.0 | 45.0 | 20 | No |
| B | 11 | Bal | 4 | 3.0 | 1.5 | 0.20 | Bal | 1.5 | 3.6 | 0.47 | 0.08 | 41.7 | 5.0 | 50.0 | 43 | Yes |
| | 12 | Bal | 6 | 6.0 | 0.8 | | Bal | 2.3 | 7.2 | 0.25 | | 31..9 | 5.0 | 45.0 | 50 | Yes |
| | 13 | Bal | 8 | 6.5 | 1.2 | 0.15 | Bal | 3.1 | 7.9 | 0.38 | 0.06 | 39..2 | 4.0 | 55.0 | 35 | Yes |

TABLE 3-continued

| Sample | Alloy Components (mass %) | | | | | Alloy Components (volume %) | | | | | Volume Ratio | Diameter of Si Particles | Hardness of Alloy | Wear Amount | Si Separation Yes/ |
|---|---|---|---|---|---|---|---|---|---|---|---|---|---|---|---|
| No. | Al | Sn | Si | Cu | Cr | Al | Sn | Si | Cu | Cr | Sn/Si | μm | Hv | μm | No |
| 14 | Bal | 12 | 3.0 | 1.0 | 0.20 | Bal | 4.8 | 3.8 | 0.33 | 0.08 | 126.3 | 2.5 | 50.0 | 38 | No |
| 15 | Bal | 20 | 3.0 | 1.5 | 0.30 | Bal | 8.5 | 4.0 | 0.52 | 0.13 | 212.5 | 4.5 | 40.0 | 60 | No |

Remark
A-Inventive Examples.
B-Comparative Examples

In the inventive Example Nos. 1-10 of Table 3, the volume % of Sn phase exceeds 50% relative to the volume % of Si particles, that is, the Sn phase volume is ½ or more of the volume of Si particles. In every one of these examples, separation of the Si particles was not appreciable after the test. The amount of wear was 20 μm or less after the test. In the Comparative Example Nos. 11-13, the Sn-phase volume % relative to the volume % of Si particles is less than 50%. Marks of separated Si particles were appreciable on the post-test sliding surface of these examples. The amount of wear amount is large. In Nos. 14-15, although the volume % of the Sn phase is more than 50% of the volume of Si particles, since the average particle diameter of Si particles is small and the hardness of the alloy is low, the amount of wear is large.

INDUSTRIAL APPLICABILITY

When a bearing apparatus according to the present invention is used under severe sliding conditions, the plain bearing exhibits improved wear resistance. Therefore, the apparatus is used under severe sliding conditions.

The invention claimed is:

1. A bearing apparatus characterized by comprising a combination of a steel shaft having hardness of HV 500 or more at least on a surface thereof, a plain bearing, wherein the plain bearing is formed of an aluminum alloy containing 2 to 10 mass % of Si, 8 to 19 mass % of Sn and the balance being Al and unavoidable impurities, having a hardness of Hv 45 or more, wherein the average particle diameter of Si of the aluminum alloy is 4 to 10 μm, and the volume of Sn phase, which is calculated by a weight % of Sn and density of pure tin, is 50% or more of the volume of the Si particles, which is calculated by a weight % of Si and density of pure silicon.

2. A bearing apparatus according to claim 1, wherein the aluminum alloy further contains 3 mass % or less in total of at least one of Cu, Mg and Zn, 0.5 mass % or less in total of at least one of Cr, Zr, Mn, V and Sc, and 0.5 mass % or less of Fe, Ti, B as inevitable impurities.

3. A bearing apparatus according to claim 1 or 2, wherein said plain bearing is a clad material of said aluminum-alloy pressure bonded by cold rolling with carbon steel.

4. A bearing apparatus according to claim 3, wherein said carbon steel is a low-carbon steel sheet.

5. A bearing apparatus according to claim 3, wherein the aluminum-based alloy having said composition is continuously cast, the resultant continuously cast sheet is cold rolled and then heat-treated, thereby adjusting average particle diameter of the Si particles, and is further subjected to said pressure bonding.

6. A bearing apparatus according to claim 5, wherein said carbon steel is a low-carbon steel sheet.

7. A bearing apparatus according to claim 1, wherein the aluminum alloy consists of Si, Sn, Al and inevitable impurities.

8. A bearing apparatus according to claim 2, wherein the aluminum alloy consists of Si, Sn, Al, at least one of Cu, Mg and Zn, at least one of Cr, Zr, Mn, V, and Sc, and inevitable impurities.

* * * * *